United States Patent [19]
Sasaki et al.

[11] Patent Number: 5,893,208
[45] Date of Patent: Apr. 13, 1999

[54] ASSEMBLY LINE SYSTEM

[75] Inventors: Toshiro Sasaki; Kenji Mizoguchi; Mitsuharu Morikawa, all of Hiroshima, Japan

[73] Assignee: Nishikawa Kasei Co., Ltd., Hiroshima, Japan

[21] Appl. No.: 08/772,890

[22] Filed: Dec. 24, 1996

[30] Foreign Application Priority Data

Dec. 25, 1995 [JP] Japan ..................... 7-336623

[51] Int. Cl.$^6$ ........................... B23P 21/00
[52] U.S. Cl. .................. 29/711; 29/430; 29/783; 29/794; 29/822; 29/823; 29/824
[58] Field of Search ................ 29/430, 794, 822, 29/823, 824, 709, 711, 712, 701, 714, 783, 784, 791; 414/222; 901/1; 198/349.6, 349.95

[56] References Cited

U.S. PATENT DOCUMENTS

| | | | |
|---|---|---|---|
| 4,069,764 | 1/1978 | Teyssedre | 104/88 |
| 4,538,950 | 9/1985 | Shiomi et al. | 414/222 |
| 5,007,783 | 4/1991 | Matsuo | 414/222 |
| 5,044,541 | 9/1991 | Sekine et al. | 228/6.1 |
| 5,125,783 | 6/1992 | Kawasoe et al. | 414/279 |
| 5,127,569 | 7/1992 | Sekine et al. | 228/6.1 |
| 5,183,368 | 2/1993 | Douard | 414/222 |
| 5,353,495 | 10/1994 | Terabayashi et al. | 29/714 |

FOREIGN PATENT DOCUMENTS

| | | | |
|---|---|---|---|
| 2-95525 | 4/1990 | Japan | 29/430 |
| 4-75833 | 3/1992 | Japan | 29/430 |
| 4-171146 | 6/1992 | Japan | 29/430 |
| 5-111833 | 5/1993 | Japan | 29/430 |
| 6-170669 | 6/1994 | Japan | 29/430 |

Primary Examiner—Paul T. Sewell
Assistant Examiner—Trinh Nguyen
Attorney, Agent, or Firm—Sixbey, Friedman, Leedom & Ferguson, P.C.; Gerald J. Ferguson, Jr.

[57] ABSTRACT

In an assembly line system, a self-propelled carrier 51 carrying thereon assembly workpieces is brought to a halt at an assembly station 11. When the assembly of the assembly workpieces is completed at the assembly station 11, the carrier 51 is driven out therefrom. More specifically, three pairs of assembly stations 11 are disposed in serial alignment and each assembly worker A–c is placed between his/her assembly station pair. Arranged on one side of the row of these three assembly station pairs is a guide line $2d$. Station guide lines 12 respectively branch off from the guide line $2d$ so as to establish connections between the guide line $2d$ and the individual assembly stations 11. A carrier orientation reversing station 15 is connected to the guide line $2d$ located upstream of the upstreammost assembly station 11 so that carriers 51 enter ones of the assembly station pairs, in the reverse-orientation state. Such arrangements allow the assembly workers A–C to perform assembly work on assembly workpieces for FAS products according to their respective assembly rates in an assembly line 1.

12 Claims, 5 Drawing Sheets

ASSEMBLY LINE SYSTEM

BACKGROUND OF THE INVENTION

1. Technical Field of the Invention

The present invention relates to an assembly line system in which a self-propelled carrier, which carries thereon a main assembly component and a plurality of secondary assembly components, is brought to a halt at an intended assembly work station and after the fitting of the secondary assembly components into the main assembly component the carrier makes an exit from the assembly work station.

2. Description of Related Art

Various assembly line systems for the assembly of workpieces by making utilization of self-propelled carriers have been known in the art.

Japanese Patent Application Pub. No. 62-48432 shows an assembly line system. In this assembly line system, a self-propelled carrier carrying thereon assembly components is brought to a halt at an assembly work station where an assembly worker is placed and after the assembly components are assembled to a unit the carrier resumes travelling.

Japanese Patent Application Pub. No. 5-116044 shows an assembly line system. In this assembly line system, a self-propelled carrier carrying thereon assembly components travels along a guide track of tape arranged on the assembly plant floor and the fitting of the assembly components is carried out at respective assembly work stations on the guide track.

Japanese Patent Application Pub. No. 4-283056 shows an assembly line system. In this assembly line system, there are provided a plurality of assembly work stations. Each of these assembly work stations is assigned a respective level of priority in being supplied with workpieces by a self-propelled carrier. When two or more of the assembly work stations make respective workpiece supply requests at almost the same time, these requests are dealt with in the order of descending priorities, in other words a carrier is dispatched to an assembly work station that is given the highest priority level among the assembly work stations that have issued the requests.

Japanese Patent Application Pub. No. 4-210358 shows an assembly line system. In this assembly line system, the length of time (work processing time) necessary for each assembly work station to complete workpiece processing is estimated and stored. In addition, the length of time (conveyance time) necessary for a carrier, loaded with workpieces, to travel to individual destinations (assembly work stations) is calculated. An assembly work station, the conveyance time of which is equal to or less than its estimated work processing time, is selected, and the carrier is dispatched to the station thus selected.

In each of these assembly line systems, workpieces are conveyed by a self-propelled carrier along an assembly line and the assembly of the workpieces is performed at an assembly work station arranged on the assembly line. These assembly line systems, however, present the problem that the entire assembly line must be changed every time there is made a change in the amount of assembly work or in the type of workpiece. For this reason, it is difficult to assemble, at high efficiency, units one by one from workpieces for FAS (flexible assembling system).

Although there may be variations in assembly rate among assembly workers, the carriers usually travel at a fixed speed. As a result, there is produced the possibility that a slow assembly worker causes trouble to other assembly workers. If, however, the speed of assembly line is adjusted to the slow assembly worker, this may result in making a fast assembly worker idle, leading to poor total assembly efficiency.

Accordingly, it is an object of the present invention to provide an improved assembly line system in which a self-propelled carrier carrying thereon workpieces travels along the assembly line and is brought to a halt at an assembly work station for the putting together of the workpieces. The assembly line system of the present invention makes it possible for assembly workers to effectively assemble workpieces to their own assembly rates, for dealing with FAS products without causing trouble to other assembly workers. Additionally, in accordance with the present invention, assembly line areas can be reduced.

SUMMARY OF THE INVENTION

Bearing in mind the above-described problems with the prior art assembly line systems, the present invention was made. More specifically, a plurality of assembly workers are stationed in serial alignment such that each of the assembly workers is stationed between two assembly work stations forming an assembly work station pair, in other words these two assembly work stations face each other across the assembly worker. A main travel guide line is arranged on one side of the row of the assembly work station pairs. Connections between the main travel guide line and the assembly work stations are established by respective station guide lines which branch off from points of the main travel guide line. Self-propelled carriers are guided and directed to the assembly work stations from the main travel guide line via the station guide lines.

The present invention provides an assembly line system. In the present assembly line system, self-propelled carriers, each of which carrying thereon a main assembly component and a plurality of secondary assembly components, are brought to a halt at respective assembly work stations arranged on an assembly line and each of the self-propelled carriers leaves the assembly work station after the fitting of the secondary assembly components into the main assembly component is completed. Additionally, in the present assembly line system:

(a) the assembly work stations are paired to form a plurality of assembly work station pairs, the plurality of assembly work station pairs being arranged in serial alignment with an assembly worker placed between assembly work stations of each of the assembly work station pairs;

(b) a main travel guide line of the assembly line is arranged on one side of the row of the assembly work station pairs such that the main guide line extends parallel with the row of the assembly work station pairs;

(c) a plurality of station guide lines are arranged which establish connections between the main travel guide line and each of the assembly work stations of the assembly work station pairs; and (d) a plurality of first branch-off indication means are provided, each of the first branch-off indication means being arranged on a section of the main travel guide line located upstream of a branch-off point at which each station guide line branches off from the main travel guide line in order that a self-propelled carrier is guided onto the station guide line directly downstream of the branch-off point.

As a result of such arrangement, when a carrier travels along the main guide line, the carrier is guided by a first branch indication means to a station guide line directly downstream of the first branch-off indication means. Thereafter, the carrier travels on the station guide line and arrives at an assembly work station in the vacant state. At the assembly work station, an assembly worker, stationed at the assembly work station, puts together workpieces provided by the carrier. After such assembly work is completed by the assembly worker, the carrier makes an exit from the work station and travels on the station guide line to the main guide line. Thereafter, the carrier continues travelling downstream on the main guide line towards, for example, downstream inspection stations.

As described above, a single assembly worker is placed between two assembly work stations forming an assembly work station pair. After the assembly worker finishes assembly work provided by a carrier at one of the assembly work stations and the carrier is driven out from the station which, as a result of, enters the vacant state, the assembly worker can perform assembly work at the other assembly work station. While the assembly worker is engaged in carrying out the assembly work, it is arranged such that a carrier enters the aforesaid vacant assembly work station from the main guide line by way of the station guide line.

When an assembly work station becomes vacant, it is arranged such that a carrier automatically enters the vacant assembly work station from the main guide line via the station guide line and an assembly is completed by a single assembly worker at the assembly work station, so that even when there is made a change in the assembly work amount or a change in the type of workpiece, there is no need to change the entire assembly line system. Only assembly workers and assembly work stations are changed according to such changes. This makes it possible to complete assemblies even for FAS at good efficiency.

Additionally, entire assembly work, provided by a carrier, is completed by a single assembly worker at an assembly work station. After the assembly work is completed, the carrier is driven out the assembly work station and the assembly work station enters the vacant state. Thereafter, it is arranged such that another carrier automatically enters the vacant assembly work station. Such arrangement makes it possible for each assembly worker to carry out their assembly work according to their own respective assembly rates even though there are differences in the assembly rate among them. Therefore, situations, in which a certain assembly worker causes trouble to other assembly workers or the other way round, can be avoided. Assembly work can be performed at high efficiency, without causing any inconvenience due to the assembly rate difference.

Even when an assembly worker leaves his/her assembly work station pair in the middle of assembly work or even when an assembly worker is not stationed at all at the time when assembly work operations start, it is possible for the other assembly workers to perform assembly work at their respective assembly work stations. This eliminates not only the need for bringing the entire assembly line system to a halt but also the need for filling an assembly work station in the stopped state with an extra assembly worker. This provides the assembly line system with good operation latitude.

Additionally, the main travel guide line is arranged on one side of the row of the assembly work station pairs and, therefore, the number of main travel guide lines required is one. This reduces assembly line area.

It may be arranged such that, after assembly work provided by a self-propelled carrier is completed at an assembly work station, the self-propelled carrier makes an exit from the assembly work station by travelling on the station guide line in an opposite direction to the direction in which the self-propelled carrier entered the assembly work station.

As a result of such arrangement, a carrier, which entered an assembly work station from the main guide line through the station guide line, leaves the assembly work station and goes back to the main guide line by travelling on the station guide line, in a direction opposite to the entry direction. As a result, the station guide line serves not only as an entry guide line but also as an exit guide line.

Additionally, it may be arranged such that:

(a) a reverse guide line for the reversing of carrier orientation is provided;

the reverse guide line being linked to a section of the main travel guide line so that the reverse guide line branches off from the section of the main travel guide line;

the section of the main travel guide line being at least located upstream of a branch-off point at which the station guide line leading to one assembly work station of the upstreammost assembly work station pair branches off from the main travel guide line wherein the aforesaid one assembly work station is located downstream of the other assembly work station of the upstreammost assembly work station pair;

(b) a carrier-orientation reversing station is disposed in the reverse guide line so that a self-propelled carrier enters the carrier-orientation reversing station with its front end facing in the forward direction (the forward-orientation state) and exits from the carrier-orientation reversing station with its rear end facing in the forward direction (the reverse-orientation state); and (c) a self-propelled carrier enters one assembly work station of the assembly work station pair in the forward-orientation state while a self-propelled carrier from the carrier-orientation reversing station enters the other assembly work station in the reverse-orientation state.

As a result of such arrangement, some self-propelled carriers travel on the reverse guide line that branches off from the main guide line and enter the carrier-orientation reversing station with its front end facing in the forward direction (in other words these carriers enter the carrier-orientation reversing station in the forward-orientation state) and are placed there in the standby state. As soon as an assembly work station that is designed to receive a carrier in the reverse-orientation state becomes vacant, a carrier, which has been kept waiting at the carrier-orientation reversing station, is dispatched, with its rear end facing in the forward direction, to the vacant assembly work station via the main travel guide line. The delivery of carriers can be executed at high efficiency.

The carrier orientation with respect to an assembly worker at one of the paired assembly work stations and the carrier orientation with respect to the assembly worker at the other assembly work station are the same. For this reason, assembly work can be performed with ease.

It may be arranged such that:

(a) a forward guide line for the forwarding of carrier orientation is provided;

the forward guide line being linked to a section of the main travel guide line so that the forward guide line branches off from the section of the main travel guide line;

the section of the main travel guide line being located at least downstream of a branch-off point at which the station guide line leading to one assembly work station of the downstreammost assembly work station pair branches off from the main travel guide line wherein the aforesaid one assembly work station is located upstream of the other assembly work station of the downstreammost assembly work station pair;

(b) a carrier-orientation forwarding station is disposed in the forward guide line so that a self-propelled carrier in the reverse-orientation state enters the carrier-orientation forwarding station and exits from the carrier-orientation forwarding station in the forward-orientation state; and (c) a self-propelled carrier, which made an exit from one assembly work station of the assembly work station pair in the reverse-orientation state, enters the carrier-orientation forwarding station in the reverse-orientation state, thereafter the self-propelled carrier leaving the carrier-orientation forwarding station in the forward-orientation state.

As a result of such arrangement, any carrier, which exits from an assembly work station with its rear end facing in the forward direction, enters the carrier-orientation forwarding station which is linked, via the forward guide line, to the main guide line. Thereafter, such a carrier exits from the carrier-orientation forwarding station with the front end facing in the forward direction, to go back onto the main guide line. In other words, even when a carrier departs from an assembly work station with the rear end facing in the forward direction, it is possible to change the orientation of the carrier, whereby the carrier can go back onto the main guide line with the front end facing in the forward direction. To sum up, even when a carrier makes an exit from an assembly work station in the reverse-orientation state, it is possible to correct the orientation of the carrier so that the carrier can travel in the original orientation state, in other words the carrier can travel with its front end facing in the forwarding direction.

It may be arranged such that:

a second branch-off indication means is provided on a section of the main travel guide line located upstream of the branch-off point at which the reverse guide line branches off from the main travel guide line, for directing a self-propelled carrier to the reverse guide line or to the main travel guide line; and a third branch-off indication means is provided on a section of the main travel guide line located upstream of the branch-off point at which the forward guide line branches off from the main travel guide line, for directing a self-propelled carrier to the forward guide line or to the main travel guide line.

As a result of such arrangement, a self-propelled carrier, which has been travelling on the main guide line, is directed or guided by the second branch-off indication means arranged upstream of the point at which the reverse guide line branches off from the main guide line, to the reverse guide line or to the main guide line. On the other hand, a self-propelled carrier, which is travelling on a section of the main guide line located upstream of the point at which the forward guide line branches off from the main guide line, is directed or guided by the third branch-off indication means, to the forward guide line or to the main guide line. Both carrier route switching from the main guide line to the carrier-orientation reversing station and carrier route switching from the main guide line to the carrier-orientation forwarding station can be performed smoothly at high efficiency.

It may be arranged such that:

(a) a first carrier-count detection means is provided;

the first carrier-count detection means detecting a correspondence between (A) the total number of self-propelled carriers which are present at locations including the assembly work stations, the carrier-orientation reversing station, the station guide lines and a section of the main travel guide line located downstream of a reference point upstream of branch-off points at which the station guide line leading to the upstreammost of all the assembly work stations and the reverse guide line each branch off from the main travel guide line and (B) a sum of the total number of assembly work stations and the number of carrier-orientation reversing stations, to provide a correspondence signal; and (b) a main carrier stop means is provided at the reference point of the main travel guide line;

the main carrier stop means controlling a self-propelled carrier to stop at the reference point of the main travel guide line when the first carrier-count detection means provides a correspondence signal.

As a result of such arrangement, the main carrier stop means is placed in the non-operation state when no correspondence signal is provided by the first carrier-count detection means. As a result, carriers are allowed to travel towards assembly work stations.

On the other hand, when the aforesaid total number and the sum agree, the first carrier-count detection means provides a correspondence signal to activate the main carrier stop means so as to prevent carriers from travelling towards assembly work stations. This prevents the unlimited delivery of carriers to the carrier-orientation reversing station and to assembly work stations when these stations are not in the vacant state. As a result, it becomes possible to achieve the stable delivery of carriers to individual assembly work stations.

It may be arranged such that:

a first exit detection means is provided which detects the exit of a self-propelled carrier from each assembly work station and provides an exit signal; and after an elapsed of a predetermined time for each assembly work station from a point in time when the first exit detection means provides an exit signal, the main carrier stop means aborts its carrier stop control.

Accordingly, even when the transit time of carrier varies with the distance from the main carrier stop means of the main travel guide line to each assembly work station, the setting of the transit time as a predetermined time for an assembly work station makes it possible to start a carrier after an elapse of such a predetermined time. As a result of such arrangement, the supply of carrier to each assembly work station can be equalized, regardless of the difference in distance between the main carrier stop means and each assembly work station.

It may be arranged such that a second exit detection means is provided which detects the exit of a carrier from the carrier-orientation reversing station and provides an exit signal and wherein the main carrier stop means aborts its carrier stop control when the second exit detection means provides the exit signal.

As a result of such arrangement, when a carrier makes an exit from the carrier-orientation reversing station, the second exit detection means detects the leaving act of the carrier from the carrier-orientation reversing station and provides an exit signal. This exit signal causes the main carrier stop means to abort its carrier stop control thereby allowing another carrier to enter the carrier-orientation reversing station. This makes it possible, when the carrier-orientation reversing station becomes vacant, to timely dispatch a carrier to the carrier-orientation reversing station.

It may be arranged such that:

(a) a second carrier-count detection means is provided; the second carrier-count detection means detecting a correspondence between (A) the total number of self-propelled carriers which travel on station guidelines with their rear ends facing in the forward direction and enter assembly work stations and (B) the total number of assembly work stations which are designed to receive self-propelled carriers which travels on the station guide lines with their rear ends facing in the forward direction, to provide a correspondence signal;

(b) a presence detection means is provided; the presence detection means detecting the presence of a self-propelled carrier at the carrier-orientation reversing station, to provide a presence signal; and (c) a secondary carrier stop means is provided in the reverse guide line; the secondary carrier stop means controlling a self-propelled carrier in such a way as not to start moving from the carrier-orientation reversing station towards the main travel guide line when the correspondence signal and the presence signal are provided from the second carrier-count detection means and from the present detection means, respectively.

As a result of the above-described arrangement, when the total number of self-propelled carriers which enter assembly work stations with their rear ends facing in the forward direction and the total number of assembly work stations which are designed to receive self-propelled carriers travelling on station guide lines with their rear ends facing in the forward direction disagree, it is such arranged that the secondary carrier stop means is placed in the non-operation state, whereby a carrier present at the carrier-orientation reversing station is allowed to start travelling towards the main guide line.

On the other hand, when these totals agree, the second carrier-count detection means provides a correspondence signal that activates the secondary carrier stop means. This prevents a carrier from departing from the carrier-orientation reversing station, therefore preventing the unlimited delivery of carriers to the assembly work stations which are designed to receive carriers travelling with their rear ends facing in the forward direction, when these stations are occupied. As a result, it becomes possible to achieve the stable delivery of carriers to individual assembly work stations.

It may be arranged such that:

(a) a delivery priority establishment means is disposed; the delivery priority establishment means establishing delivery priority such that upstream assembly work stations are given higher precedence in being supplied with self-propelled carriers over downstream assembly work stations;

(b) a delivery priority determination means is disposed; when a self-propelled carrier makes an exit from any one of the assembly work stations thereby leaving the assembly work station vacant, the delivery priority determination means making a comparison in delivery priority between the vacant assembly work station and each of other assembly work stations in the vacant state on the basis of the determined delivery priority levels after an elapse of a predetermined time from the time of such an exit, to determine a destination assembly work station; and (c) control means is disposed; the control means providing, based on the result of the delivery priority determination operation by the delivery priority determination means, a control signal to the second branch-off indication means arranged on the main travel guide line so that the second branch-off indication means indicates a travel line for a self-propelled carrier.

When a carrier makes an exit from an assembly work station thereby leaving the assembly work station vacant, it is judged after an elapse of a predetermined time from the time of the exit of the carrier that the carrier is no longer present on a station guide line subject to delivery priority determination. Thereafter, the delivery priority determination means makes a comparison in delivery priority between the vacant assembly work station and another vacant assembly work station according to the delivery priority levels determined by the delivery priority establishment means. Upstream assembly work stations are given, by the delivery priority establishment means, higher delivery priority in comparison with downstream assembly work stations. For example, a vacant assembly work station is given higher delivery precedence over another vacant assembly work station if the former assembly work station is disposed upstream of the latter assembly work station. Each of assembly work stations in the vacant state is assigned its own delivery priority level, which makes it possible to achieve smooth carrier delivery.

It may be arranged such that:

(a) passage detection means is disposed; the passage detection means detecting the passing of a self-propelled carrier through a section of the main travel guide line located downstream of the second branch-off indication means, to provide a passage signal; and (b) control means is disposed; the control means providing, upon receipt of the passage signal from the passage detection means, a branch-off signal to the second branch-off indication means located upstream of a destination assembly work station or the carrier-orientation reversing station, to guide the carrier to the destination assembly work station or to the carrier-orientation reversing station.

As a result of such arrangement, when a self-propelled carrier moves to the main travel guide line located downstream of the second branch-off indication means, such movement of the carrier is detected by the passage detection means. The control means receives a passage signal from the passage detection means and provides a branch-off signal to the second branch-off indication means disposed upstream of a destination assembly work station or the carrier-orientation reversing station, to activate the second branch-off indication means. The carrier is guided and directed by the second branch-off indication means from the main travel guide line to the destination assembly work station or to the carrier-orientation reversing station. Accordingly, the supply/guiding of a carrier from the main guide line to an intended assembly work station or to the carrier-orientation reversing station can be achieved with a simple structure.

It may be arranged such that a temporary fixation means is disposed on a section of the main travel guide line located directly upstream of said second branch-off indication means wherein the temporary fixation means detects the passing of a self-propelled carrier through the section of the main travel guide line whereby a destination assembly work station, determined at the time of the detection by the delivery priority determination means, is fixed as a temporary destination of the carrier.

The temporary fixation means detects the passing of a carrier through the main travel guide line located directly upstream of the second branch-off indication means and a destination assembly work station determined at the time of the detection by the delivery priority determination means, is fixed as a temporary destination of the carrier. As a result of such arrangement, even when a certain length of time elapses between when the main branch-off indication means receives a signal from the control means that indicates a carrier travel line and when the main branch-off indication means starts operating after the delivery priority determination means determines a destination assembly work station, a destination assembly work station, determined by the delivery priority determination means, is fixed as a temporary carrier destination during such a period. This eliminates the possibility that a destination assembly work station for a carrier is changed to another one due to the operation delay of the second branch-off indication means resulting in delivering the carrier to such a different assembly work station. The present invention makes it possible to deliver a carrier to a previously-determined assembly work station without fail.

PREFERRED EMBODIMENT OF THE INVENTION

Figure 1:
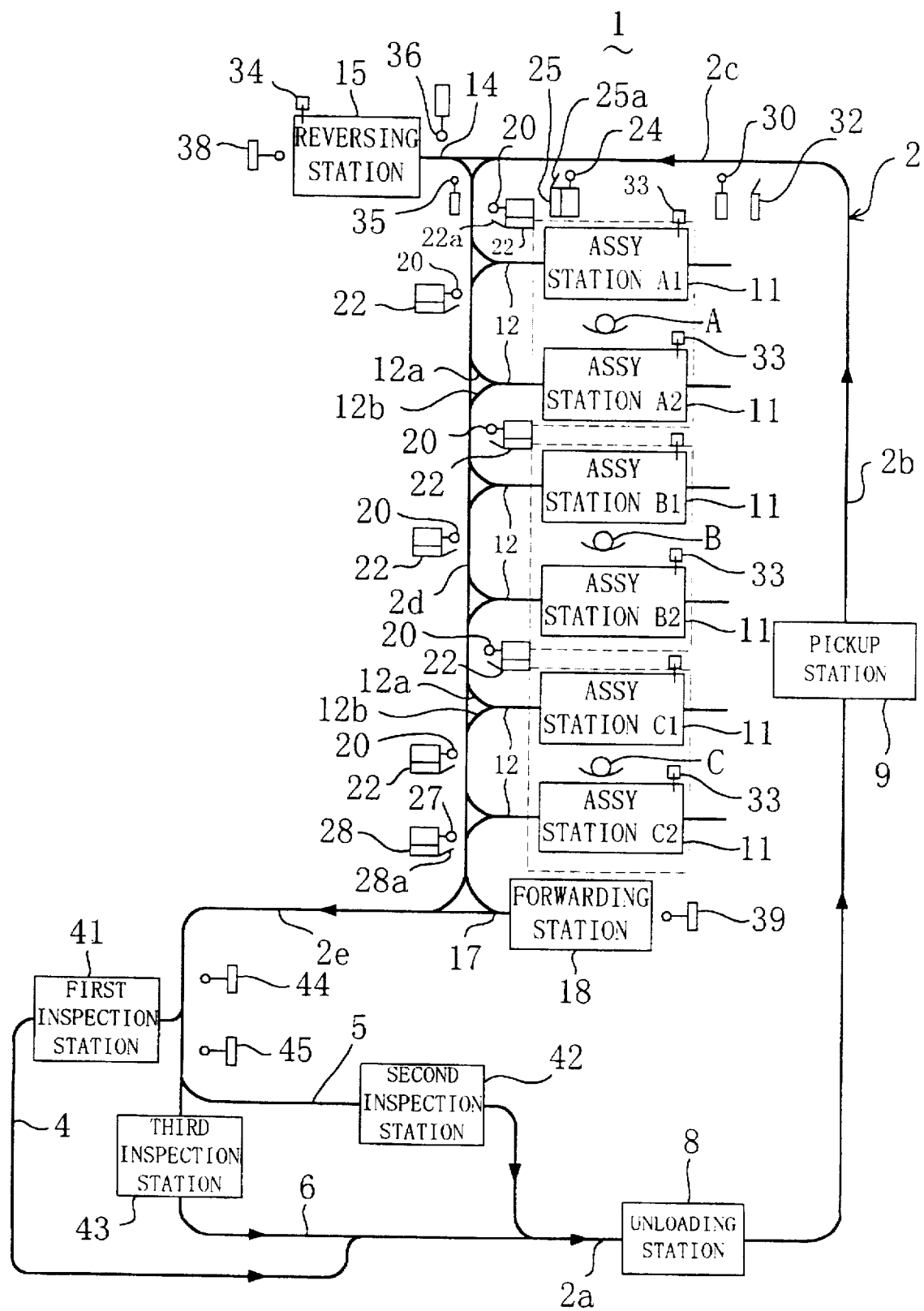
FIG. 1 outlines the entire structure of an assembly line system of an embodiment of the present invention.
Figure 4:
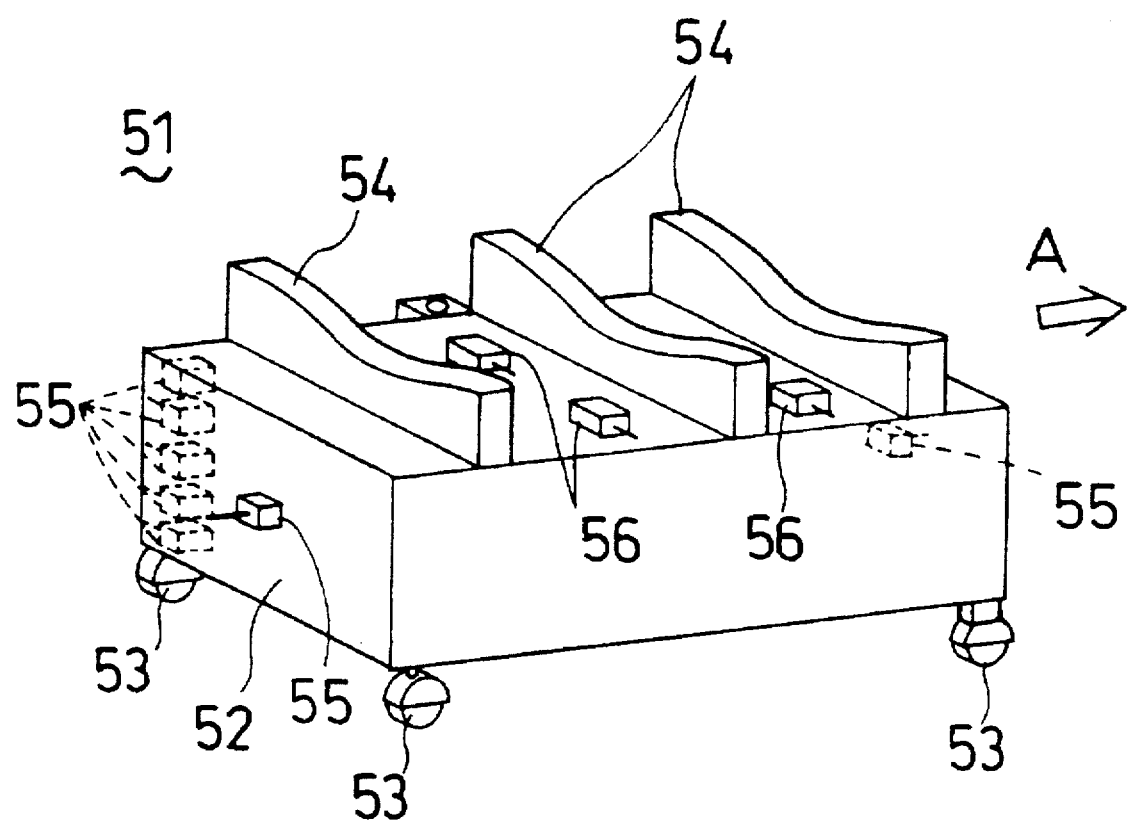
FIG. 4 is a perspective view schematically illustrating a self-propelled carrier.

FIG. 1 shows an entire assembly line system according to an embodiment of the present invention. In the present assembly line system, a self-propelled carrier 51, shown in FIG. 4, moves around along a loop-like assembly line 1 arranged on the assembly plant floor for the assembly of workpieces (not shown in the figure) carried by the carrier 51. More particularly, various assembly workpieces are fitted to a vehicle instrument panel on a carrier 51 in this assembly line system.

The assembly line 1 is made of reflective tape, such as metallic tape, and is adhered to the assembly plant floor. The self-propelled carrier 51 moves around the assembly line 1. Arrow A of FIG. 4 indicates a direction in which the self-propelled carrier 51 travels in the forward-orientation state, in other words the carrier 51 in the forward-orientation state travels with its front end facing in the forward direction.

The carrier 51 is a self-propelled carrier known in the art as an auto guide vehicle (AGV). The carrier 51 includes a carrier body 52, a plurality of wheels 53 mounted to the underside of the carrier body 52 and a workpiece support 54 for the pickup/unloading of assembly workpieces from the right-hand side of the carrier 51 with respect to the travel direction A in which the carrier 51 travels in the forward-orientation state. Some of the wheels 53 are guide wheels which are steered by an electric actuator (not shown in the figure) housed in the carrier body 52. The operation of the electric actuator is controlled by a carrier controller (not shown in the figure) connected to a battery. The travel orientation of the carrier 51 is changed by the guide wheels 53.

Predetermined ones of the wheels 53 are drive wheels. These drive wheels 53 are connected to an electric motor (not shown in the figure) disposed in the carrier body 52. The electric motor is driven by the battery. The operation of the electric motor is controlled by the carrier controller. The carrier controller controls the motor so that the carrier 51 moves forward or backward or stops. The carrier body 52 is provided, at the underside thereof, with a sensor (not shown in the figure) for sensing the position of the reflective tape forming the assembly line 1 arranged on the assembly plant floor. The output of the sensor is connected to the carrier controller. The reflective tape is detected by the sensor and the guide wheels 53 are steered in such a way as to follow the reflective tape while the driving wheels 53 are driven, whereby the carrier 51 moves along the reflective tape (the assemble line 1).

Arranged in vertical alignment at the rear end of the left-hand side face of the carrier body 52 of the carrier 51 are a plurality of external indication signal limit switches 55. These limit switches 55 may be mounted on the right-hand side face or on both the side faces of the carrier body 52. Additionally, each of the front and rear end surfaces of the carrier body 52 is provided with one external indication signal limit switch 55. Each of the limit switches 55 is connected to the carrier controller. It is arranged such that, when the carrier 51 is on the move, branch-off dogs 20, 24 and 27, switch dogs 38 and 39, fixed dogs 44 and 45 and drive-out gates 30 and 36, which are described later, come into contact with corresponding limit switches 55 so that the limit switches 55 turn on or turn off. The carrier controller examines a signal generated by such contact so as to control both the electric motor for driving the carrier 51 and the electric actuator for steering the carrier 51, whereby the travel line of the carrier 51 is changed and switching between "travel" and "stop" is made.

The carrier body 52 is provided, on the top thereof, with a plurality of workpiece determination limit switches 56 for determining the type of workpieces placed on the workpiece support 54 (i.e., the type of instrument panel by vehicle version). The carrier 51 is provided with a carrier exit switch (not shown). When each of assembly workers A–C finishes his/her assembly work at an assembly work station 11 which is described later, the assembly worker operates the carrier exit switch mounted on the carrier 51 so that the carrier 51 makes an exit from the assembly work station 11.

As shown in FIG. 1, the assembly line 1 includes a main travel guide line 2. The main travel guide line 2 is made up of five guide lines, namely a first guide line 2a, a second guide line 2b, a third guide line 2c, a fourth guide line 2d and a fifth guide line 2e. The upstream end of the guide line 2a is linked to each of the downstream ends of inspection guide lines 4–6. The upstream end of the guide line 2b is linked to the downstream end of the guide line 2a, and the guide line 2b extends, from the connection, in a direction perpendicular to the guide line 2a. The upstream end of the guide line 2c is linked to the downstream end of the guide line 2b, and the guide line 2c runs parallel with the guide line 2a. The upstream end of the guide line 2d is linked to the downstream end of the guide line 2c, and the guide line 2d runs parallel with the guide line 2b towards the guide line 2a. The guide line 2d extends in a direction perpendicular to the guide lines 2a and 2c. The upstream end of the guide line 2e is linked to the downstream end of the guide line 2d, and the guide line 2e runs parallel with the guide line 2a. The guide line 2e extends in a direction perpendicular to the guide lines 2b and 2d. The downstream end of the guide line 2e is linked to each of the upstream ends of the inspection guide line 4–6.

Disposed on the guide line 2a is an unloading station 8 for the unloading of completed assemblies from carriers 51 in the halt state. Additionally, disposed on the guide line 2b downstream of the unloading station 8 is a pickup station 9. A carrier 51, whose load has been unloaded at the unloading station 8, is brought to a halt at the pickup station 9 so that the empty carrier 51 is loaded with workpieces (an instrument panel and assembly components which are fitted into the instrument panel).

Arranged on one side of the guide line 2d, i.e., arranged between the guide line 2d and the guide line 2b, are three pairs of assembly work stations (ASSY stations) 11 for three assembly workers A–C (more specifically, the assembly worker A is assigned an ASSY station pair of ASSY stations A1 and A2, the assembly worker B is assigned an ASSY station pair of ASSY stations B1 and B2 and the assembly worker C is assigned an ASSY station pair of ASSY stations C1 and C2), and the ASSY station pairs are in serial alignment so that they extend along the guide line 2d. In other words, the guide line 2d of the main travel guide line 2 is arranged on one side of the row of the ASSY station pairs. The assembly workers A, B and C are placed between A1 and A2, between B1 and B2 and between C1 and C2, respectively. In FIG. 1, the ASSY station pairs are indicated by broken line. For example, a carrier 51, which carries thereon an instrument panel and assembly components, is brought to a halt at the ASSY station A1 and the assembly worker A performs assembly work to fit the assembly components into the instrument panel. Thereafter, the assembly worker A drives out the carrier 51 from the ASSY station A1. Then, the assembly worker A turns around approximately an angle of 180 degrees to perform assembly work, supplied by another carrier 51, at the opposite ASSY station A2. Thereafter, the assembly worker A drives out the carrier 51 from the ASSY station A2. Such assembly operations are repeatedly performed for each ASSY station pair in alternate fashion.

Each ASSY station 11 is linked to the guide line 2d by a respective station guide line 12 of a "cul-de-sac" structure (a closed-at-one-end structure) including an entry line 12a and an exit line 12b, as shown in FIG. 1. As a result of such arrangement, a carrier 51 enters an ASSY station 11 from the guide line 2d through an entry line 12a and is driven out from the ASSY station 11 to the guide line 2d through the exit line 12b. In other words, the carrier 51 enters and leaves the ASSY station 11 in opposite directions.

It is arranged such that the orientation of a carrier 51 that enters one of the paired ASSY stations 11, 11 is opposite to the orientation of a carrier 51 that enters the other one, with respect to the assembly worker. Note that the ASSY stations A1, B1 and C1 are called upstream stations since they are disposed upstream of the ASSY stations A2, B2 and C2 (the downstream ASSY stations), respectively. It is arranged such that the carrier 51 enters an upstream ASSY station in the forward-orientation state and is driven out from the upstream ASSY station in the reverse-orientation state. Additionally, it is further arranged such that the carrier 51, whose orientation has been changed from forward to reverse by a carrier-orientation reversing (COR) station 15, accordingly enters the downstream ASSY station in the reverse-orientation state and is driven out from the downstream ASSY station in the forward-orientation state.

There is provided a reverse guide line 14 for reverse orientation of a cul-de-sac structure. More specifically, the reverse guide line 14 branches off from a connection between the downstream end of the guide line 2c and the upstream end of the guide line 2d, extending in the same direction that the guide line 2c extends. The reverse guide line 14 leads to the COR station 15. It is arranged such that the carrier 51 enters the COR station 15 in the forward-orientation state and is driven out therefrom assuming the reverse-orientation state. With the upstream ASSY stations (A1, B1, C1), it is arranged such that the carrier 51 enters these stations in the forward-orientation state. On the other hand, with the downstream ASSY stations (A2, B2, C2), it is arranged such that the carrier 51 from the COR station 15 enters these stations in the reverse-orientation state.

There is provided a forward guide line 17 for forward orientation of a cul-de-sac structure. The forward guide line 17 branches off from a connection between the downstream end of the guide line 2d and the upstream end of the guide line 2e, extending in the same direction that the guide line 2e extends. The forward guide line 17 leads to a carrier-orientation forwarding (COF) station 18. More specifically, it is arranged such that a carrier 51, which have entered the COF station 18 in the reverse-orientation state, is driven out therefrom in the forward-orientation state. A carrier 51, which exits from an upstream ASSY station in the reverse-orientation state, is made to travel still in the reverse-orientation state on the guide line 2d so that the carrier 51 enters the COF station 18 in the reverse-orientation state. Thereafter, the carrier 51 leaves the COF station 18, in the forward-orientation state, in other words the carrier 51 makes an exit from the COF station 18 and travels on the guide line 2e with its front end facing in the forward direction.

Figure 5:
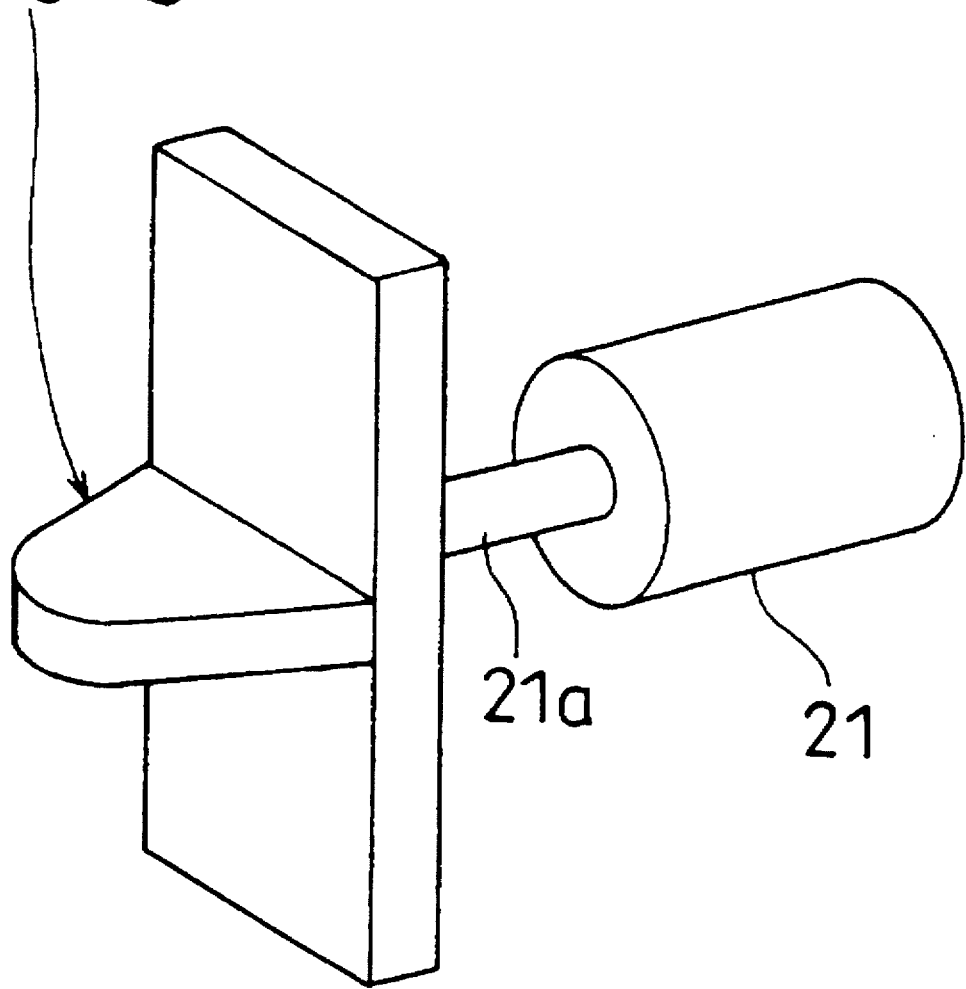
FIG. 5 is a perspective view schematically illustrating an example of a branch-off dog.

Six first branch-off dogs 20 (first branch-off indication means) are arranged on both sides of the guide line 2d of the main travel guide line 2 as shown in FIG. 1. Each branch-off dog 20 is disposed directly upstream of a branch-off point at which each entry line 12a branches off from the guide line 2d. Each of the branch-off dogs 20 is formed by a movable dog capable of guiding a carrier 51 to an intended station guide line 12. FIG. 5 illustrates an example of the branch-off dog 20. This branch-off dog 20 is mounted to the leading end of a piston rod 21a of a cylinder 21 so that, by extending the piston rod 21a, the branch-off dog 20 is brought into contact with a predetermined one of the limits switches 55 mounted on the carrier 51, whereby the predetermined limit switch 55 turns on or turns off. The actuator for steering the carrier 51 is activated so that the travel line of the carrier 51 is switched to a station guide line 12 directly downstream of the branch-off dog 20, as a result of which the carrier 51 travels towards an ASSY station 11 linked to the station guide line 12.

Additionally, the cylinder 21 of the first branch-off dog 20 is provided with a first carrier passage limit switch 22 including an oscillating bar 22a. When the carrier 51 passes through the limit switch 22 and enters the station guide line 12 from the guide line 2d, the limit switch 22 detects such passing of the carrier 51 and generates a passage signal.

There is provided a second branch-off dog 24 (a second branch means). The second branch-off dog 24 is a movable dog. The second branch-off dog 24 is located on the guide line 2c. More specifically, the second branch-off dog 24 is disposed (a) near the downstream end of the guide line 2c upstream of a branch-off point at which the reverse guide line 14 branches off from the guide line 2c and (b) on the left-hand side of the guide line 2c when viewing from the upstream side. The branch-off dog 24 directs and guides the carrier 51 to the reverse guide line 14 or to the guide line 2d. The second branch-off dog 24 is identical in structure with the branch-off dog 20 so that the same reference numerals are applied to like parts. The second branch-off dog 24 is mounted to the leading end of a piston rod 21a of a cylinder 21. When the piston rod 21 extends, the branch-off dog 24 is brought into contact with a predetermined one of the external guide signal limit switches 55 mounted on the left-hand side of the carrier 51, whereby the predetermined limit switch 55 turns on or turns off. This activates the steering actuator of the carrier 51 so that the travel line of the carrier 51 is switched between the reverse guide line 14 and the guide line 2d.

Additionally, the cylinder 21 for the branch-off dog 24 is provided with a second carrier passage limit switch 25 (a passage detection means) including an oscillating bar 25a capable of establishing contact with the carrier 51. When the carrier 51 passes through the position of the limit switch 25 and is driven out from the guide line 2c in the direction of the guide line 2d or in the direction of the guide line 14, the limit switch 25 detects such passing of the carrier 51 and provides a passage signal (a drive-out signal).

Disposed on the guide line 2d is a third branch-off dog 27 (a third branch guide means) which is a movable dog. More specifically, the third branch-off dog 27 is disposed on the guide line 2d between a branch-off point at which the station guide line 12 leading to the downstreammost ASSY station 11 branches off from the guide line 2d and a branch-off point at which the forward guide line 17 branches off from the guide line 2d. The branch-off dog 27 is located on the right-hand side of the guide line 2d when viewed from the upstream side. The carrier 51 is guided by the branch-off dog 27 to the forward guide line 17 or to the guide line 2d (the guide line 2e). The third branch-off dog 27 is identical in structure with the first and second branch-off dogs 20 and 24 (see FIG. 5). When the piston rod 21a is placed in the extending state, the branch-off dog 27 is brought into contact with a predetermined one of the external guide signal limit switches 55 mounted on the left side of the carrier 51. The predetermined limit switch 55, as a result of such contact, turns on or off and the steering actuator of the carrier 51 is activated whereby the carrier 51 is directed to the forward guide line 17 or to the guide line 2d (the guide line 2e).

Additionally, the third branch-off dog 27 includes a third carrier passage limit switch 28 with an oscillating bar 28a that comes to contact with the carrier 51. When the carrier 51 passes through the limit switch 28, the limit switch 28 detects such passing of the carrier 51 and generates a passage signal.

A predetermined point of the guide line 2c, which is located upstream of the branch-off dog 24, serves as a reference point. Provided at this reference point is a main drive-out gate 30 functioning as a main carrier stop means. More specifically, the main drive-out gate 30 is disposed on the left-hand side of the guide line 2c when viewed from the upstream side. The main drive-out gate 30 is mounted to the leading end of a piston rod of a cylinder (not fully shown in the figure). When the piston rod is in the extending state, the main drive-out gate 30 is brought into contact with a predetermined one of the external guide signal limit switches 55 of the carrier 51, as a result of which the drive motor is stopped. This prevents the carrier 51 from starting moving from the position of the gate 30 (the reference point) towards the guide line 2d or towards the reverse guide line 14.

A temporary fixation limit switch 32 is disposed on the left-hand side of the guide line 2c when viewed from the upstream side. More specifically, the limit switch 32 is placed in the upstream of the gate 30, that is, in the upstream of the second branch-off dog 24. The limit switch 32, which forms a temporary fixation means, detects the passing of a carrier 51 through the guide line 2c so that the destination of the carrier 51 is temporarily fixed at an ASSY station 11 determined at the detection time of such passing by a delivery priority determination section 65 which is described later.

Each ASSY stations 11 is provided with a first exit detection limit switch 33 (a first exit detection means). The limit switch 33 detects the exit of a carrier 51 from an ASSY station 11. When the limit switch 33 detects such a carrier exit, the limit switch 33 provides an exit signal.

There is provided a fourth branch-off dog 35. The branch-off dog 35 is disposed on the left-hand side, when looking at the COR station 15, of a connection of the guide line 14 and the guide line 2. The fourth branch-off dog 35 guides a carrier 51, which exits from the COR station 15 in the reverse-orientation state, to the guide line 2d. The COR station 15 is provided with a second exit detection limit switch 34 which is a second exit detection means. The second exit detection limit switch 34 detects the exit of a carrier 51 in the reverse-orientation state from the COR station 15 and provides an exit signal. A secondary drive-out gate 36 (a secondary carrier stop means) is disposed on the right-hand side of the reverse guide line 14 when looking at the COR station 15. The drive-out gate 36 controls a carrier 51 not to start travelling from the COR station 15 towards the guide line 2d (the main travel guide line 2). Like the main drive-out gate 30, the secondary drive-out gate 36 is mounted to a piston rod of a cylinder. When the piston rod extends, the gate 36 is brought into contact with a predetermined one of the limit switches 55 of the carrier 51, whereby the drive motor comes to a halt. This prevents the carrier 51 from starting moving towards the guide line 2d of the main travel guide line 2.

A switch dog 38, which is a fixed dog, is disposed at the deep end of the reverse guide line 14. A switch dog 39, which is a fixed dog, is disposed at the deep end of the forward guide line 17. When a carrier 51 enters the COR station 15, the limit switch 55 mounted on the front end surface of the carrier 51 comes to contact with the switch dog 38 whereby the travel orientation of the carrier 51 is changed from forward to reverse. On the other hand, when a carrier 51 enters the COF station 18, the limit switch 55 mounted on the rear end surface of the carrier 51 comes to contact with the switch dog 39 whereby the travel orientation of the carrier 51 is changed from reverse to forward.

The upstream end of the guide line 2a is linked to each of the downstream ends of first to third inspection guide lines 4–6. The downstream end of the guide line 2e is linked to each of the upstream ends of the inspection guide lines 4–6. The main travel guide line 2 and the inspection guide lines 4–6 together form the loop-like assembly line 1.

The inspection guide lines 4–6 branch off in parallel from the main travel guide line 2e according to the type of workpiece (the version of vehicle). More specifically, the inspection guide line 4, the inspection guide line 5 and the inspection guide line 6 branch off from the guide line 2e in that order, as shown in FIG. 1. The inspection guide line 4 and the inspection guide line 6 are merged at their downstream ends to form a single guide line. This guide line and the inspection guide line 5 are merged. A first inspection station 41, a second inspection station 42 and a third inspection stations 43 are arranged in the inspection guide lines 4–6, respectively, for checking different completed assemblies for defect. The carrier 51 is brought to a halt at a corresponding one of the inspection stations 41–43 for inspection.

A first fixed dog 44 is disposed directly upstream of the inspection station 41 so that a carrier 51 travels on the guide line 4 towards the inspection station 41. A second fixed dog 45 is disposed between the first fixed dog 44 and a branch-off point at which the inspection guide lines 5 and 6 branch off so that a carrier 51 travels on the inspection guide line 5 towards the inspection station 42. Based on the signal of the limit switch 56 of the carrier 51 and based on the contact state of the carrier 51 with each fixed dog 44 and 45, the carrier 51 is directed to one of the inspection stations 41–43 according to the type of workpiece.

Figure 3:
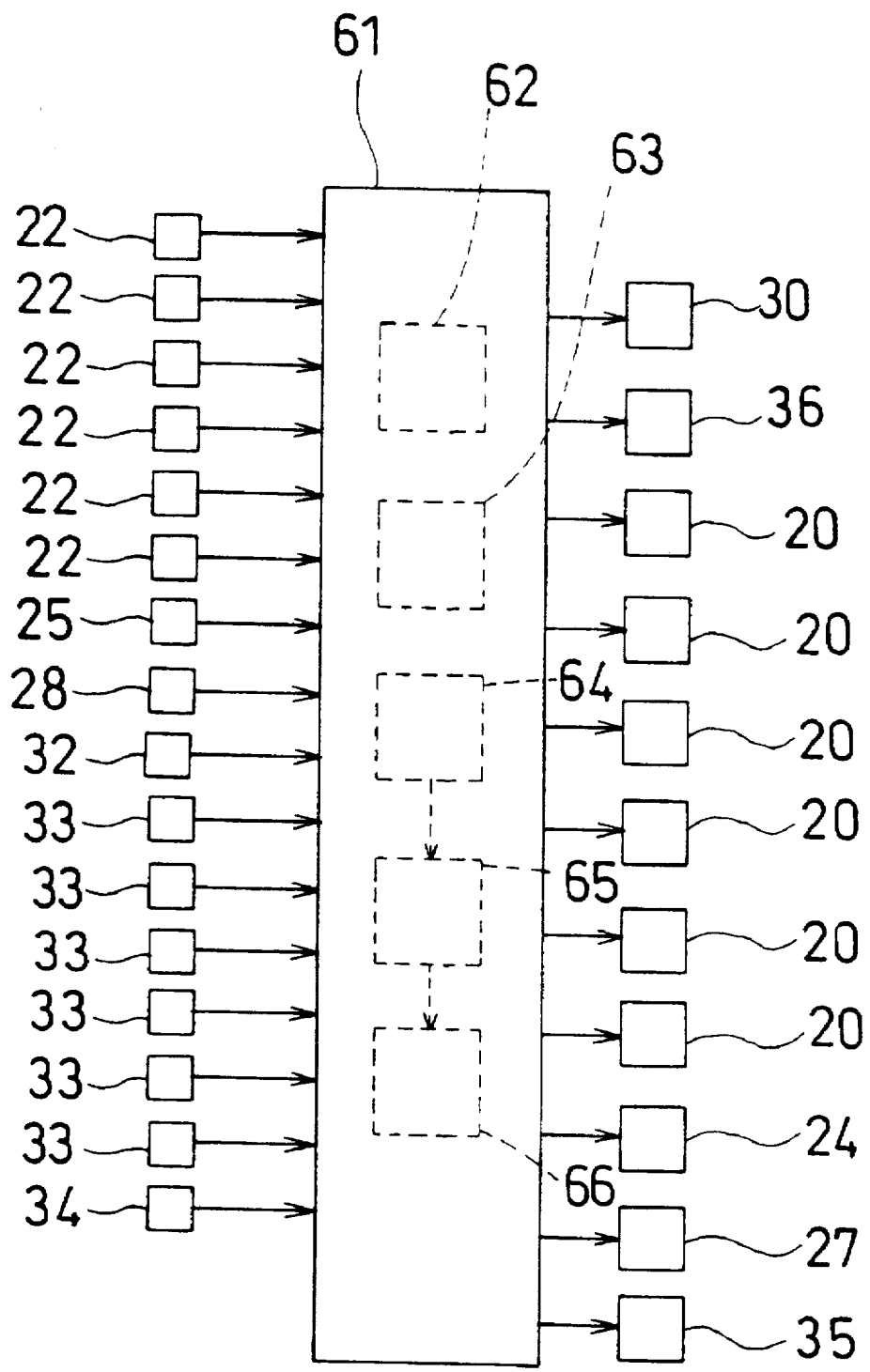
FIG. 3 shows in block form a control system.

As shown in FIG. 3, the operation of the cylinders of the first to fourth branch-off dogs 20, 24, 27 and 35 and the operation of the cylinders of the main and secondary drive-out gates 30 and 36 are controlled by a control unit 61. The control unit 61 is connected to the limit switches 22 and the limit switch 28 arranged along the guide line 2d, to the limit switch 25 and the limit switch 32 arranged along the guide line 2c, to the limit switches 33 arranged in the ASSY stations 11 and to the limit switch 34 of the reverse guide line 14.

The control unit 61 includes a first carrier-count detection section 62, a second carrier-count detection section 63, a delivery priority establishment section 64, a delivery priority determination section 65 and a control section 66.

The first carrier-count detection section 62 counts the total number of carriers 51 which are present at locations including (a) the ASSY stations 11, (b) the COR station 15, (c) the guide lines 2c and 2d downstream of the position of the main drive-out gate 30 (the reference point) and (d) station guide lines 12. When the total number corresponds to a sum of the number of ASSY stations 11 (six) and the number of COR stations 15 (one), the first carrier-count detection section 62 provides a correspondence signal. When a correspondence signal is provided form the detection section 62, the piston rod of the cylinder of the main drive-out gate 30 extends thereby preventing the carrier 51 from going beyond the reference point and travelling to any one of the ASSY stations 11 arranged downstream thereof or to the COR station 15. Thereafter, when a limit switch 33, disposed at an ASSY station 11, detects the exit of a carrier 51 from the ASSY station 11, the limit switch 33 provides an exit signal indicative of such an exit of the carrier 51. After an elapse of a predetermined time for each ASSY station 11 from the time when the exit signal is provided, the cylinder piston rod withdraws thereby cancelling the carrier motion stop control. Such a predetermined time for each ASSY station 11 is determined on the basis of the travelling time from the main drive-out gate 30 to the individual ASSY stations 11.

Additionally, when the limit switch 34 detects the exit of a carrier 51 from the COR station 15 and provides an exit signal, the cylinder piston rod of the main drive-out gate 30 withdraws so as to cancel the carrier motion stop control.

The second carrier-count detection section 63 counts the total number of carriers 51 each of which travels on a station guide line 12 in the reverse-orientation state and enters an ASSY station 11. The detection section 63 provides a correspondence signal when the total number corresponds to the number of ASSY stations 11 which are designed to receive carriers 51 in the reverse-orientation state (in this embodiment, the number of such carriers is three). When a correspondence signal is sent out from the second carrier-count detection section 63 and when the limit switch 34 detects the presence of a carrier 51 at the COR station 15 and provides a carrier presence signal (i.e., when the limit switch 34 detects that the carrier 51 has not left the COR station 15), the cylinder piston rod of the secondary drive-out gate 36 extends, whereby the carrier 51 is controlled not to start travelling from the COR station 15 onto the main travel guide line 2.

The six ASSY stations 11 are pre-assigned their respective supply-delivery priority levels by the delivery priority establishment section 64. The upstream ASSY stations 11 (A1, B1, C1) are given higher delivery priority in being supplied with a carrier 51 than the downstream ASSY stations 11 (A2, B2, C2).

When any one of the ASSY stations 11 becomes vacant (i.e. when a carrier 51 departs from any one of the ASSY stations 11), a comparison, in delivery priority in being supplied with a carrier 51, between the vacant ASSY station 11 and each of other ASSY stations 11 in the vacant state is made by the determination section 65 after an elapse of a predetermined time from the exit time of the carrier 51.

Based on the result of the delivery priority comparison operation found by the determination section 65, the control section 66 provides a control signal to the cylinder 21 of the branch-off dog 24 in the guide line 2c so that the branch-off dog 24 can indicate a travel line for the carrier 51. When the limit switch 25 detects the passing of the carrier 51 through the main travel guide line 2 downstream of the second branch-off dog 24, the limit switch 25 provides a carrier passage signal, and in order to guide the carrier 51 to a target ASSY station 11 in the vacant state, a branch signal is sent to the cylinder 21 of the branch-off dog 20 disposed directly upstream of the target ASSY station 11 so that the piston rod 21a of the cylinder 21 extends.

Figure 2:
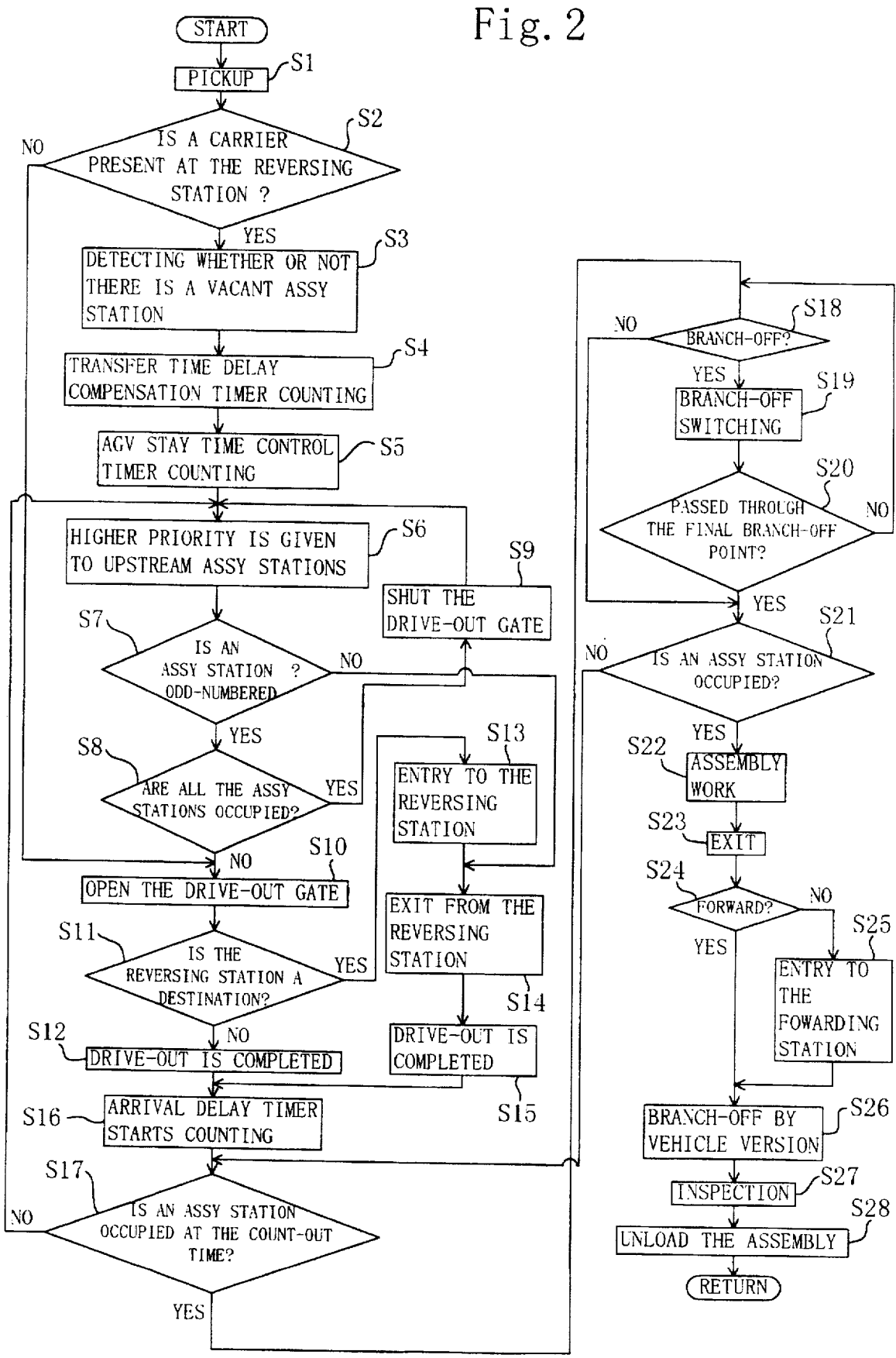
FIG. 2 is a flow diagram useful in understanding the sequence of operations from the pickup of workpieces to the unloading of a completed assembly in the assembly line.

FIG. 2 illustrates the steps occurring during the assembly work in the assembly line 1 from the loading of assembly components including an instrument panel up to the unloading of a completed assembly.

A carrier 51 is brought to a halt at the pickup station 9 on the main travel guide line 2. At the pickup station 9, an instrument panel is placed onto a workpiece support 54 of the carrier 51 and assembly components are put into component housing boxes (not shown in the figure) of the carrier 51 (STEP S1).

Next, STEP S2 determines whether a carrier 51 is present at the COR station 15. If, at STEP S2, it is determined that a carrier 51 is present at the COR station 15, then STEP S3 detects ASSY stations 11 in the vacant state according to the signal of the limit switches 33 of the ASSY stations 11.

Thereafter, with respect to the vacant ASSY stations 11 thus detected by STEP S3, a compensation timer is made to count for the inherent transfer time delay of each of the vacant ASSY stations 11 so as to detect an elapse of a predetermined time according to the transfer time of the carrier 51 to each of the vacant ASSY stations 11 (STEP S4).

A timer for fixed stay time indicative of the presence of a carrier 51 at the COR station 15 on the station guide lines 12 and at the ASSY stations 11, is made to count (STEP S5). After the counting-up of the these timers, the vacant ASSY stations 11 are assigned delivery priority levels on a location basis, in other words higher delivery priority is given to upstream ASSY stations 11, and indication signals corresponding to the delivery priority levels are sent to the cylinder 21 of the branch-off dog 24 (STEP S6).

Next, STEP S7 determines whether or not a destination ASSY station 11 is odd-numbered, in other words STEP S7 detects whether or not a destination ASSY station 11 is any one of the upstream ASSY stations A1, B1 and C1. If so (i.e., the destination ASSY station 11 is assigned an odd number), STEP S8 then determines whether or not all the ASSY stations 11 in the system are currently occupied by carriers 51. If the result of STEP S8 is "YES" (i.e., every ASSY station 11 is occupied), then the piston rod of the main drive-out gate 30 extends so that no carriers 51 can go beyond the position of the gate 30, in other words no carrier 51 can make a transit from the guide line 2c into the COR station 15 or into an ASSY station 11 (STEP S9). On the other hand, if STEP S8 says "NO", the cylinder piston rod of the main drive-out gate 30 then withdraws as in a case where no carrier 51 is present at the COR station 15, thereby allowing a carrier 51 to travel towards the COR station 15 or towards an ASSY station 11 (STEP 10). Thereafter, STEP S11 determines whether or not such a driven-out carrier 51 from the gate 30 is one to be received by the COR station 15. If not, the drive-out of the carrier 51 from the main drive-out gate 30 is detected by the limit switch 25. The limit switch 25, as a result of such detection, provides a signal that causes the cylinder 21 of the first branch-off dog 20 to operate (STEP S12).

On the other hand, if the result of STEP S11 is "YES", in other words if the driven-out carrier 51 is one whose destination is the COR station 15, the carrier 51 then proceeds and enters the COR station 15 (STEP S13). Next, as in a case where a destination ASSY station is even-numbered, in other words when a destination ASSY station is any one of the downstream ASSY stations 11 (A2, B2, C2), a carrier 51 is driven out from the COR station 15 (STEP S14). The drive-out of the carrier 51 from the main drive-out gate 30 is detected by the limit switch 25. The limit switch 25, as a result of such detection, provides a signal that causes the cylinder 21 of the first branch-off dog 20 to operate (STEP S15).

Thereafter, an arrival delay timer starts counting at STEP S16. At the time of the counting-out of the arrival delay timer, STEP S17 determines, based on the output signal of the limit switch 33 of the ASSY station 11, whether or not the ASSY station 11 is supplied with a carrier 51. If the result of STEP S17 is "NO", in other words if STEP S17 finds out that the ASSY station 11 is in the vacant state, the assembly processing goes back to STEP S6. The arrival delay timer determines an estimated time from the time when a carrier 51 is driven out from the main drive-out gate 30 to the time when the carrier 51 arrives at a target ASSY station 11. In a case where the carrier 51 has not arrived at its target ASSY station 11 even after an elapse of the estimated time, it is judged that the carrier 51 is in the out-of-order state or the like and requests a re-delivery.

Since the carrier 51, driven out from the main drive-out gate 30, has already been given by the branch-off dog 24 an instruction indicative of a target ASSY station 11, STEP S18 determines whether or not the carrier 51, which is travelling on the guide line 2d, makes a transit from the guide line 2d to a station guide line 12 for the ASSY station 11. If STEP S18 says "YES", the piston rod 21a of the cylinder 21 of the branch-off dog 20, located upstream of a branch-off point at which the station guide line 12 for the target ASSY station 11 branches off, extends so as to switch the travel line of the carrier 51 to the station guide line 12, whereby the carrier 51 travels on the station guide line 12 and enters the target ASSY station 11 (STEP S19). Thereafter, STEP S20 determines whether or not the carrier 51 has passed through the last (downstreammost) branch-off point in the guide line 2d (i.e., a point at which a station guide line 12 for the downstreammost ASSY station 11 (C2) branches off from the guide line 2d). If not, then STEPS S18 and S19 are repeated. On the other hand, if the result of STEP S20 is "YES", STEP S21 then determines, based on the output signal of the limit switch 33 of the ASSY station 11, whether or not the ASSY station 11 is filled with a supply provided by the carrier 51, as in a case where no branch-off instruction signal is input at STEP S18. If the result of STEP S21 is "NO", then the assembly processing goes back to STEP S17 for determining carrier delivery priority level for vacant ASSY stations 11.

If the result of STEP S21 is "YES" indicating the presence of a carrier 51 at the target ASSY station 11, then carriers 51 are brought to a halt at ASSY stations 11 in order that the assembly workers A, B and C carry out their respective assembly work (STEP S22). After each of the assembly work is completed, each assembly worker A–C operates the exit switch mounted on the carrier 51 so that the carrier 51 leaves the ASSY station 11 (STEP S23). The carrier 51, driven out from the ASSY station 11, travels on the station guide line 12 in the direction opposite to the entry direction and then on the guide line 2d in the downstream direction. At this time, even when a limit switch 55 of the carrier 51 comes to contact with a downstream branch-off dog 20, a resulting signal is cancelled, thereby preventing the carrier 51 from making a transition from the guide line 2d to a downstream station guide line 12.

Thereafter, STEP S24 determines whether or not the carrier 51, driven out from the ASSY station 11, is travelling downstream on the guide line 2d in the forward-orientation state. If, at STEP S24, it is detected that the carrier 51 is in the forward-orientation state, the carrier 51 then continues travelling on the guide line 2d down towards any one of the inspection guide lines 4–6. On the other hand, if, at STEP S24, it is detected that the carrier 51 is in the reverse-orientation state, then the cylinder 21 of the third branch-off dog 27 operates in order that the carrier 51 is directed to the forward guide line 17 leading to the COF station 18 in which the orientation of the carrier 51 is changed from reverse to forward. The carrier 51, now in the forward-orientation state, then goes back to the guide line 2d and travels towards any one of the inspection guide lines 4–6 (STEP S25).

The carrier 51 is directed by the first fixed dog 44 or the second fixed dog 45 to one of the inspection lines 4–6 according to the type of workpiece (i.e., the version of vehicle) at STEP S26. The carrier 51 is brought to a halt at one of the inspection stations 41–43 for assembly inspection (STEP S27). Finally, the carrier 51 comes to a stop at the unloading station 8 for assembly unloading (STEP S28). Thereafter, the above-described steps are repeated.

The movement of the carrier 51 and the assembly of workpieces are now described below. Suppose here that two ASSY stations 11, e.g., the ASSY station 11 (A2) of the assembly worker A and the ASSY station 11 (C1) of the assembly worker C, enter the vacant state at the same time. These two ASSY stations A2 and C1 are compared with each other in delivery priority in being supplied with a carrier 51, and it is determined that the ASSY station A2, since it is located upstream of the ASSY station C1, has a higher delivery priority level than the ASSY station C1. A plurality of carriers 51, which are loaded with workpieces at the pickup station 9, travel on the guide line 2c of the main travel guide line 2 in the forward-orientation state and approach the second branch-off dog 24. It is arranged by the operation of specified limit switches 55 such that a carrier 51 in the lead is first delivered to the ASSY station C1 and, thereafter, a second carrier 51 following the leading carrier 51 is delivered to the ASSY station A2.

When the main drive-out gate 30 is in the open state, the first carrier 51, driven out from the main drive-out gate 30, moves onto the guide line 2d, in the forward-orientation state. Such a drive-out act is detected by the limit switch 25. The limit switch 25 provides a signal so that only the branch-off dog 20, which is disposed at a branch-off point at which the station guide line 12 leading to the ASSY station C1 branches off from the guide line 2d, projects by the extending of the piston rod 21a of the cylinder 20 of that branch-off dog 20. The carrier 51 travels downstream in the forward-orientation state. When the carrier 51 arrives at a branch-off point at which the aforesaid station guide line 12 branches off from the guide line 2d, a predetermined one of the limit switches 55 mounted on the carrier 51 comes to contact with the aforesaid projecting branch-off dog 20. As a result, the carrier 51 enters the station guide line 12 by way of the entry line 12a in the forward-orientation state and is brought to a halt at the ASSY station C1 for the assembly worker C to carry out his/her assembly work on workpieces delivered by the carrier 51.

A lapse of time is counted at the point in time when the first carrier 51 is driven out from the main drive-out gate 30. Before the lapse of time reaches a transfer delay time which is the time taken for the carrier 51 to travel from the driven-out position to the ASSY station C1, the second carrier 51 is driven out from the main drive-out gate 30 and moves onto the reverse guide line 14 in the forward-orientation state. The carrier 51 is reversed in travel orientation when brought into contact with the switch dog 38 in the COR station 15, whereby the carrier 51 is driven out from the COR station 15 in the reverse-orientation state. Such a drive-out act is detected by the limit switch 34, and the limit switch 34 provides a signal. The signal causes the piston rod 21a of the cylinder 21 of the fourth branch-off dog 35 to extend and the branch-off dog 35 then projects. The projected branch-off dog 35 comes into contact with a predetermined one of the limit switches 55 mounted on the carrier 51 and the carrier 51 then makes a transit onto the guide line 2d. Additionally, the signal from the limit switch 34 causes the piston rod 21a of the cylinder 21 of the first branch-off dog 20, located at a branch-off point at which the station guide line 12 leading to the ASSY station A2 branches off from the guide line 2d, to extend so that the first branch-off dog 20 projects. The carrier 51 travels downstream on the guide line 2d in the reverse-orientation state. When the carrier 51 arrives at the aforesaid branch-off point, a predetermined one of the limit switches 55 of the carrier 51 comes into contact with the projecting branch-off dog 20. As a result, the carrier 51 enters the entry line 12a of the station guide line 12 and is brought to a halt at the ASSY station A2, and the assembly worker A carries out his/her assembly work on workpieces delivered by the carrier 51.

Upon completion of the assembly work at the ASSY stations A2 and C1 by the assembly workers A and C, the carriers 51 are driven out from the work stations A2 and C2, respectively. More specifically, the carrier 51, driven out from the ASSY station A2, travels on the station guide line 12 in the opposite carrier-orientation state (the forward-orientation state) to the entry carrier-orientation state (the reverse-orientation state), thereafter making a transition onto the guide line 2d. Then, the carrier 51 travels downstream on the guide line 2d in the forward-orientation state. On the other hand, the carrier 51, driven out from the ASSY station C1, travels on the station guide line 12 in the opposite carrier-orientation state (the reverse-orientation state) to the entry carrier-orientation state C1 (the forward-orientation state), thereafter making a transition onto the guide line 2d. Then, the carrier 51 travels downstream on the guide line 2d in the reverse-orientation state. At the downstream end of the guide line 2d, the carrier 51 is made by the third branch-off dog 27 to move onto the forward guide line 17 in the reverse-orientation state. In the COF station 18 the carrier 51 comes into contact with the switch dog 39, whereby the carrier 51 is placed in the forward-orientation state. The carrier 51 exits from the COF station 18 and travels on the forward guide line 17 in the forward-orientation state. The carrier 51 then makes a transition from the forward guide line 17 to the guide line 2e. Each of these carriers 51 is directed to a respective inspection station (one of the inspection stations 41–43) according to the version of vehicle for the inspection of completed assemblies. The inspected assemblies are unloaded at the unloading station 8 and the carriers 51 with no load thereon go back to the pickup station 9.

In accordance with the present embodiment, the assembly worker A is stationed between the paired ASSY stations A1 and A2, the assembly worker B is stationed between the paired ASSY stations B1 and B2 and the assembly worker C is stationed between the paired ASSY stations C1 and C2. For example, the assembly worker A performs assembly work on assembly components provided by a carrier 51 at the ASSY station A1 and drives out, when the assembly components are assembled to a unit, the carrier 51 from the ASSY station A1 which then becomes vacant. Thereafter, while the assembly worker A carries out assembly work at the ASSY station A2, it is arranged such that another carrier 51 carrying thereon assembly components enters the vacant ASSY station A1 from the main travel guide line 2 via the station guide line 12. In this way, a carrier supply is automatically made to a vacant ASSY station 11 from the main travel guide line 2, and entire assembly work is carried out by a single assembly worker. When one of the paired ASSY stations becomes vacant, it is arranged such that a carrier 51 automatically enters the vacant ASSY station whereby the entire assembly work can be completed by a single assembly worker. Accordingly, even when the amount of assembly work or the type of workpiece changes, it is sufficient, in order to cope with such a change, to change assembly workers and ASSY stations. Accordingly, there is no need to change the entire assembly line 1, and even for the case of FAS products assembly work can be carried out at high efficiency.

Additionally, entire assembly work, provided by a carrier 51, is completed by a single assembly worker at an ASSY station 11. After the assembly work is completed, the carrier 51 is driven out from the assembly work station 11 which, as a result, enters the vacant state. Thereafter, it is arranged such that another carrier 51 automatically enters that vacant ASSY station 11. Such arrangement makes it possible for each assembly worker to carry out their assembly work according to their own respective assembly rates even though there are differences in the assembly rate among them. Therefore, situations, in which a certain assembly worker causes trouble to other assembly workers or the other way round, can be avoided. Assembly work can be performed at high efficiency, without causing any inconvenience resulting from the assembly rate difference.

Even when an assembly worker leaves his/her assembly work station pair in the middle of assembly work or even when an assembly worker is not stationed at all at the time when assembly work operations started, it is possible for the other assembly workers to perform assembly work at their respective ASSY stations 11. This eliminates not only the need for bringing the entire assembly line system 1 to a halt but also the need for filling a vacant assembly work station in the stopped state with an extra assembly worker. This provides the assembly line system 1 with good operation latitude.

Additionally, the guide line 2d is arranged on one side of the row of the work station pairs and, therefore, the required number of guide lines which are connected to each ASSY station 11 is one. This reduces assembly line area.

When assembly work, which is supplied by a carrier 51, is completed at an ASSY station 11, the carrier 51 makes an exit from the ASSY station 11 by travelling on the station guide line 12 in a direction opposite to the entry direction. As a result, the station guide line 12 serves not only as an entry guide line for the carrier 51 to enter the ASSY station 11 from the guide line 2d but also as an exit guide line for the carrier 51 to exit from the ASSY station 11.

The carrier entry orientation to one of the paired ASSY stations and the carrier entry orientation to the other ASSY station with respect to the assembly worker are in opposite fashion, in other words the orientation of carrier with respect to the assembly worker at one of the paired ASSY stations and the orientation of carrier with respect to the assembly worker at the other ASSY station are the same. This facilitates assembly work operations.

It is required that the carrier 51 enters an ASSY station 11 with its workpiece support 54 facing the assembly worker. This means that the carrier 51 enters each upstream ASSY station 11 (A1, B1, C1) in the forward-orientation state while on the other hand the carrier 51 enters each downstream ASSY station 11 (A2, B2, C2) in the reverse-orientation state. In the present embodiment, the reverse guide line 14 is arranged in such a way as to branch off from a connection between the guide line 2c and the guide line 2d, and the COR station 15 is disposed in the reverse guide line 14. Because of the provision of the COR station 15, the carrier's 51 orientation can be changed from forward to reverse orientation. In addition, it is arranged in the present invention such that a carrier 51 always stands by at the COR station 15. As soon as any one of the downstream ASSY stations 11 (A2, B2, C2), designed to receive carriers in the reverse-orientation state, becomes vacant, the carrier 51, which is kept waiting at the COR station 15, is made to travel in the reverse-orientation state to such a vacant ASSY station 11 by way of the guide line 2d. The carrier's 51 delivery is performed at high efficiency.

The forward guide line 17 is connected to the downstream end of the guide line 2d in branch-off fashion, and the COF station 18 is arranged in the forward guide line 17. As a result of such arrangement, carriers 51 from the upstream ASSY stations 11 (A1, B1, C1), which travel downstream on the guide line 2d in the reverse-orientation state, can easily be orientation-inverted by the COF station 18 from reverse to forward orientation. This makes it possible for even carriers 51 which exit from the upstream ASSY stations 11 (A1, B1, C1) to arrive at the inspection stations 41-43, in the forward-orientation state.

The second branch-off dog 24 is disposed on a section of the guide line 2c located upstream of the branch-off point at which the reverse guide line 14 branches off from the guide line 2c. In addition to the second branch-off dog 24, the third branch-off dog 27 is disposed on a section of the guide line 2d located upstream of the branch-off point at which the forward guide line 17 branches off from the guide line 2d.

Because of the provision of the second branch-off dog 24, a carrier 51, which is travelling on the guide line 2c, is directed to the reverse guide line 14 or to the guide line 2d. On the other hand, a carrier 51, which is travelling on the guide line 2d, is directed by the third branch-off dog 27 to enter the forward guide line 17 or to continue travelling on the guide line 2d. Therefore, it becomes possible that both carrier route switching from the main travel guide line 2 to the COR station 15 and carrier route switching from the main travel guide line 2 to the COF station 18 are performed smoothly at high efficiency.

If the total number of carriers 51 present at locations including the ASSY stations 11, the COR station 15, the guide lines 2c and 2d downstream of the main drive-out gate 30 (the reference point) and the station guide lines 12 and a sum of the number of ASSY stations 11 and the number of COR stations 15 agree, this causes the main drive-out gate 30 to operate thereby preventing a carrier 51 from going beyond the reference point, in other words no carriers 51 are allowed to travel towards the guide line 2d leading to each ASSY station 11 or towards the reverse guide line 14 leading to the COR station 15. This prevents the unlimited delivery of carriers 51 to the COR station 15 and to each ASSY station when these stations are not in the vacant state. As a result, it becomes possible to achieve the stable delivery (supply) of carriers to, for example, the individual ASSY stations 11.

It is arranged such that the limit switch 33 detects the exit of a carrier 51 from an ASSY station 11 and provides an exit signal. After an elapsed of a predetermined time for each ASSY station 11 from the when the limit switch 33 provides an exit signal, the main drive-out gate 30 aborts its carrier stop control. Accordingly, even when the transit time of carrier varies with the distance between the main drive-out gate 30 and each ASSY station 11, it is possible to start a carrier 51 after an elapse of such a transit time. As a result of such arrangement, the supply of carriers to the individual ASSY stations 11 can be set equally, regardless of the difference in distance.

Additionally, it is arranged such that the limit switch 34 detects the exit of a carrier 51 from the COR station 15 and provides an exit signal. This exit signal causes the main drive-out gate 30 to abort its carrier stop control. As a result of such arrangement, when the COR station 15 enters the vacant state, the supply of a carrier 51 to the COR station 15 is made smoothly.

When a sum of the number of carriers 51 which are travelling, in the reverse-orientation state, on the guide line 2d or station guide lines 12 to ASSY stations 12 and the number of carriers 51 which are present at ASSY stations 11 in the reverse-orientation state, and the number of ASSY stations 11 which are designed to receive carriers 51 in the reverse-orientation state agree and when there is a carrier 51 at the COR station 15, the secondary drive-out gate 36 prevents the carrier 51 present at the COR station from departing therefrom. This accordingly prevents the unlimited delivery of carriers 51 to each ASSY station 11 that is not in the vacant state. As a result, it becomes possible to achieve the stable delivery (supply) of carriers 51 to the individual ASSY stations 11.

It is set such that higher delivery priority is given to upstream ASSY stations. When any one of the ASSY stations 11 becomes vacant, i.e., when a carrier 51 makes an exit from an ASSY station 11, a comparison in delivery priority between the vacant ASSY station 11 and each of other ASSY stations 11 in the vacant state is made after an elapse of a predetermined time from the exit time of the carrier 51. Based on the result of the delivery priority comparison, the second branch-off dog 24 indicates a carrier travel line in the main travel guide line 2. The assembly stations 11 in the vacant state are assigned their respective delivery priority levels in an order in which the level of delivery priority decreases from upstream to downstream. As a result, a plurality of vacant ASSY stations 11 can adequately be provided with a carrier 51.

Additionally, the passing of a carrier 51 through the position of the second branch-off dog 24 is detected by the limit switch 25. The limit switch 25 then provides a branch-off signal to the cylinder 21 of the first branch-off dog 20 disposed directly upstream of the carrier's 51 destination ASSY station 11. The carrier 51 can be directed from the main travel guide line 2 to its destination ASSY station 11 with a simple structure.

In the present embodiment, the number of pairs of ASSY stations arranged on one side of the guide line 2d is three. The number may be increased up to four or more or may be decreased down to two or less. Additionally, a plurality of units, each of which comprises a guide line 2d and ASSY stations 11 which are linked to the guide line 2d, may be disposed in parallel. These arrangements may be employed according to the space and layout of an assembly plant.

In the present embodiment, the reverse guide line 14 is connected, in branch-off fashion, to a section of the main travel guide line 2 located upstream of the branch-off point at which the station guide line 12 leading to the upstreammost ASSY station 11 branches off from the main travel guide line 2. The reverse guide line 14 may be connected, in branch-off fashion, to a section of the main travel guide line 2 located at least upstream of the branch-off point at which the station guide line 12 leading to the second upstreammost ASSY station 11 which is designed to receive a carrier 51 travelling in the reverse-orientation state.

Likewise, the forward guide line 17 may be connected, in branch-off fashion, to a section of the main travel guide line 2 located at least downstream of the branch-off point at which the station guide line 12 leading to the ASSY station C1 (the upstream ASSY station of the downstreammost ASSY station pair) from which a carrier 51 is driven out assuming the reverse orientation state.

The present invention has been described by taking, as an example, a case in which assembly components are fitted to a vehicle instrument panel. However, the present invention may find applications in any case other than the above where a self-propelled carrier 51 carrying thereon assembly workpieces travels and is brought to a halt at an ASSY station 11, and entire assembly work (the fitting of assembly components) is performed by a single assembly worker.

The invention claimed is:

1. An assembly line system wherein self-propelled carriers, each of which carrying thereon a main assembly component and a plurality of secondary assembly components, are brought to a halt at respective assembly work stations arranged on an assembly line and wherein each said self-propelled carrier leaves said assembly work station after the fitting of said secondary assembly components into said main assembly component is completed, wherein:

(a) said assembly work stations are paired to form a plurality of assembly work station pairs, said plurality of assembly work station pairs being arranged in serial alignment with an assembly worker placed between assembly work stations of each said assembly work station pair;

(b) a main travel guide line of said assembly line is arranged on one side of the row of said assembly work station pairs such that said main travel guide line extends parallel with the row of said assembly work station pairs;

(c) a plurality of station guide lines are arranged which establish connections between said main travel guide line and each of said assembly work stations; and (d) a plurality of first branch-off indication means are provided, each of said first branch-off indication means being arranged on a section of said main travel guide line located upstream of a branch-off point at which each said station guide line branches off from said main travel guide line in order that a self-propelled carrier is guided onto said station guide line directly downstream of said branch-off point.

2. An assembly line system according to claim 1 wherein, after assembly work provided by a self-propelled carrier is completed at an assembly work station, said self-propelled carrier leaves said assembly work station by travelling on said station guide line in an opposite direction to the direction in which said self-propelled carrier entered said assembly work station.

3. An assembly line system according to claim 2, wherein:

(a) a reverse guide line for the reversing of carrier orientation is disposed;

said reverse guide line being linked to a section of said main travel guide line so that said reverse guide line branches off from said section of said main travel guide line;

said section of said main travel guide line being located at least upstream of a branch-off point at which said station guide line leading to one assembly work station of the upstreammost assembly work station pair branches off from said main travel guide line wherein said one assembly work station is located downstream of the other assembly work station of the upstreammost assembly work station pair;

(b) a carrier-orientation reversing station is disposed in said reverse guide line so that a self-propelled carrier in the forward-orientation state enters said carrier-orientation reversing station and exits from said carrier-orientation reversing station in the reverse-orientation state; and (c) a self-propelled carrier enters one assembly work station of said assembly work station pair in the forward-orientation state while a self-propelled carrier from said carrier-orientation reversing station enters the other assembly work station in the reverse-orientation state.

4. An assembly line system according to claim 3, wherein:

(a) a forward guide line for the forwarding of carrier orientation is disposed;

said forward guide line being linked to a section of said main travel guide line so that said forward guide line branches off from said section of said main travel guide line;

said section of said main travel guide line being located at least downstream of a branch-off point at which said station guide line leading to one assembly work station of the downstreammost assembly work station pair branches off from said main travel guide line wherein said one assembly work station is located upstream of the other assembly work station;

(b) a carrier-orientation forwarding station is disposed in said forward guide line so that a self-propelled carrier in the reverse-orientation state enters said carrier-orientation forwarding station and exits from said carrier-orientation forwarding station in the forward-orientation state; and (c) a self-propelled carrier, which made an exit from one assembly work station of said assembly work station pair in the reverse-orientation state, enters said carrier-orientation forwarding station in the reverse-orientation state, thereafter said self-propelled carrier leaving said carrier-orientation forwarding station in the forward-orientation state.

5. A assembly line system according to claim 4 wherein second branch-off indication means is disposed on a section of said main travel guide line located upstream of said branch-off point at which said reverse guide line branches off from said main travel guide line, for directing a self-propelled carrier to said reverse guide line or to said main travel guide line and wherein third branch-off indication means is disposed on a section of said main travel guide line located upstream of said branch-off point at which said forward guide line branches off from said main travel guide line, for directing a self-propelled carrier to said forward guide line or to said main travel guide line.

6. An assembly line system according to claim 3 wherein:

(a) first carrier-count detection means is disposed;

said first carrier-count detection means detecting a correspondence between (A) the total number of self-propelled carriers which are present at locations including said assembly work stations, said carrier-orientation reversing station, said station guide lines and a section of said main travel guide line located downstream of a reference point upstream of branch-off points at which said station guide line leading to the upstreammost of all of said assembly work stations and said reverse guide line each branch off from said main travel guide line and (B) a sum of the total number of assembly work stations and the number of carrier-orientation reversing stations, to provide a correspondence signal; and (b) main carrier stop means is disposed at said reference point of said main travel guide line;

said main carrier stop means controlling a self-propelled carrier to stop at said reference point of said main travel guide line when said first carrier-count detection means provides said correspondence signal.

7. An assembly line system according to claim 6 wherein first exit detection means is disposed which detects the exit of a self-propelled carrier from said assembly work station and provides an exit signal and wherein, after an elapsed of a predetermined time for each of said assembly work stations from a point in time when said first exit detection means provides said exit signal, said main carrier stop means aborts its carrier stop control.

8. An assembly line system according to claim 6 wherein second exit detection means is disposed which detects the exit of a carrier from said carrier-orientation reversing station and provides an exit signal and wherein said main carrier stop means aborts its carrier stop control when said second exit detection means provides said exit signal.

9. An assembly line system according to claim 3, wherein:

(a) second carrier-count detection means is disposed;

said second carrier-count detection means detecting a correspondence between (A) the total number of self-propelled carriers which travel on station guide lines in the reverse-orientation state and enter assembly work stations and (B) the total number of assembly work stations which are designed to receive self-propelled carriers which travels on station guide lines in the reverse-orientation state, to provide a correspondence signal;

(b) presence detection means is disposed;

said presence detection means detecting the presence of a self-propelled carrier at said carrier-orientation reversing station, to provide a presence signal; and (c) secondary carrier stop means is disposed in said reverse guide line;

said secondary carrier stop means controlling a self-propelled carrier in such a way as not to start moving from said carrier-orientation reversing station towards said main travel guide line when said correspondence signal and said presence signal are provided from said second carrier-count detection means and from said present detection means, respectively.

10. An assembly line system according to claim 5, wherein:

(a) delivery priority establishment means is disposed;

said delivery priority establishment means establishing delivery priority in being supplied with a self-propelled carrier such that upstream assembly work stations are given higher delivery priority levels than downstream assembly work stations;

(b) delivery priority determination means is disposed;

when a self-propelled carrier makes an exit from any one of said assembly work stations thereby leaving said assembly work station vacant, said delivery priority determination means making a comparison in delivery priority between said vacant assembly work station and each of other assembly work stations in the vacant state on the basis of said determined delivery priority levels after an elapse of a predetermined time from the time of such an exit, to determine a destination assembly work station; and (c) control means is disposed;

said control means providing, based on the result of said delivery priority determination operation by said delivery priority determination means, a control signal to said second branch-off indication means arranged on said main travel guide line so that said second branch-off indication means indicates a travel line for a self-propelled carrier.

11. An assembly line system according to claim 10, wherein:

(a) passage detection means is disposed;

said passage detection means detecting the passing of a self-propelled carrier through a section of said main travel guide line located downstream of said second branch-off indication means, to provide a passage signal; and (b) control means is disposed;

said control means providing, upon receipt of said passage signal from said passage detection means, a branch-off signal to said second branch-off indication means located upstream of a destination assembly work station or said carrier-orientation reversing station, to guide said carrier to said destination assembly work station or to said carrier-orientation reversing station.

12. An assembly line system according to claim 10, wherein temporary fixation means is disposed on a section of said main travel guide line located directly upstream of said second branch-off indication means;

said temporary fixation means detecting the passing of a self-propelled carrier through said section of said main travel guide line whereby a destination assembly work station, determined at the time of said detection by said delivery priority determination means, is fixed as a temporary destination of said carrier.

* * * * *